United States Patent
Roth

(10) Patent No.: US 6,644,266 B1
(45) Date of Patent: Nov. 11, 2003

(54) METHOD FOR OPERATING AN INTERNAL COMBUSTION ENGINE

(75) Inventor: Andreas Roth, Muehlacker-Lomersheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/009,346

(22) PCT Filed: May 26, 2000

(86) PCT No.: PCT/DE00/01719

§ 371 (c)(1),
(2), (4) Date: Dec. 10, 2001

(87) PCT Pub. No.: WO00/77375

PCT Pub. Date: Dec. 21, 2000

(30) Foreign Application Priority Data

Jun. 9, 1999 (DE) .......................................... 199 26 310

(51) Int. Cl.$^7$ ................................................. F02B 17/00
(52) U.S. Cl. ........................................ 123/295; 123/699
(58) Field of Search ................................. 123/295, 294, 123/302, 699, 434

(56) References Cited

U.S. PATENT DOCUMENTS 6,202,624 B1 * 3/2001 Stuerz et al. ................ 123/295
6,213,087 B1 * 4/2001 Oder .......................... 123/295

FOREIGN PATENT DOCUMENTS

| DE | 198 29 308 | 3/1999 |
| EP | 0 893 593 | 1/1999 |
| JP | 04 094444 | 3/1992 |
| JP | 10 018890 | 1/1998 |
| JP | 11 062731 | 3/1999 |
| JP | 11 132097 | 5/1999 |

* cited by examiner

*Primary Examiner*—Bibhu Mohanty
(74) *Attorney, Agent, or Firm*—Walter Ottesen

(57) ABSTRACT

An internal combustion engine (1), especially for a motor vehicle is described, which is provided with a combustion chamber (4) into which fuel can be injected directly by an injection valve (9) and can be ignited by a spark plug (10) in a first operating mode during an induction phase or in a second operating mode during a compression phase. An air/fuel mixture can be supplied via a tank venting (15, 16, 17) to the combustion chamber (4). The internal combustion engine (1) is controlled (open loop and/or closed loop) by a control apparatus (18) in such a manner that, in a third operating mode, a lean air/fuel mixture is drawn into the combustion chamber (4) via the tank venting (15, 16, 17) and, additionally, fuel is injected into the combustion chamber (4) in the induction phase and in the compression phase.

9 Claims, 1 Drawing Sheet

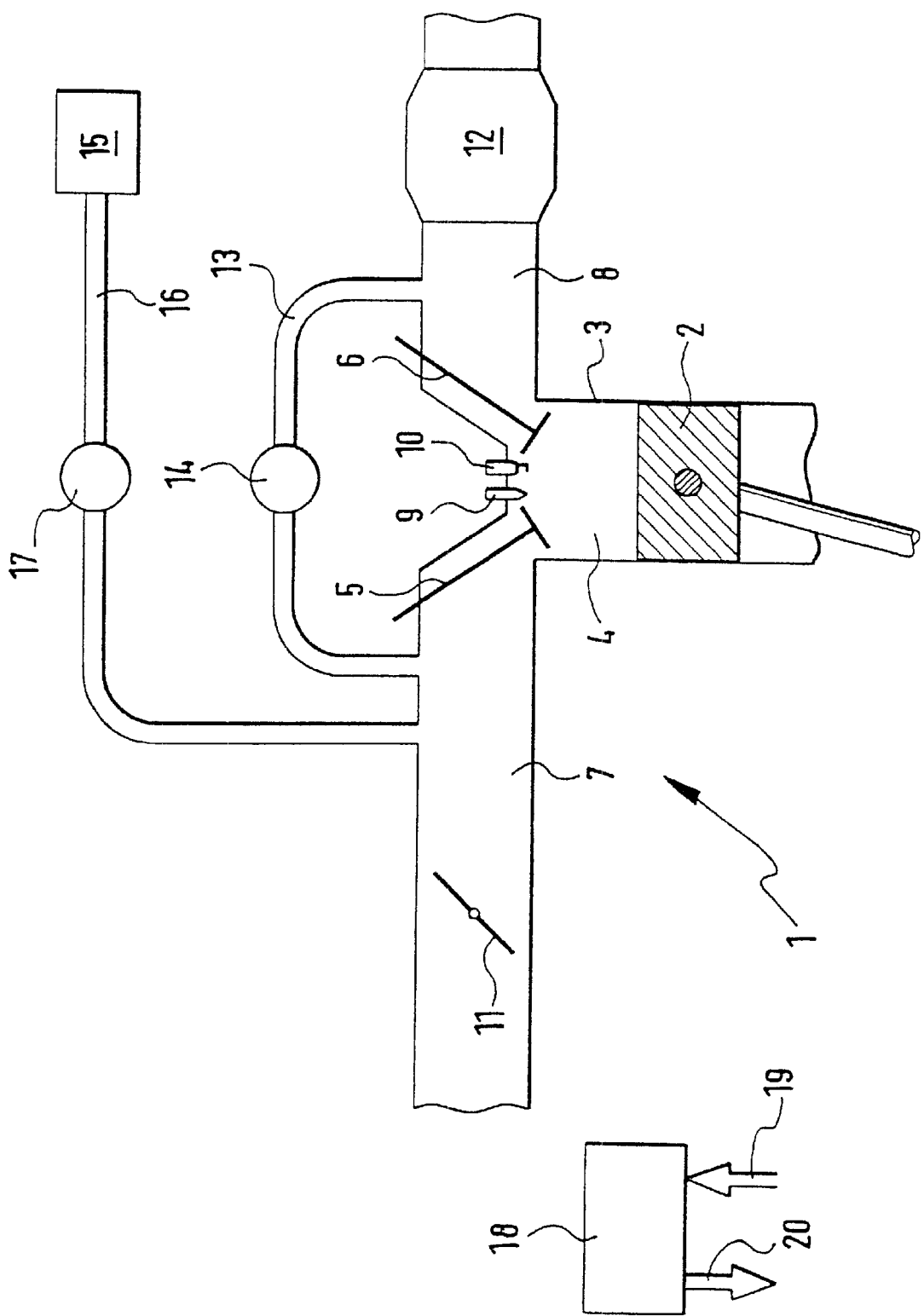

METHOD FOR OPERATING AN INTERNAL COMBUSTION ENGINE

FIELD OF THE INVENTION

The invention relates to a method for operating an internal combustion engine especially of a motor vehicle wherein the fuel is injected directly into the combustion chamber in a first operating mode during an induction phase or in a second operating mode during a compression phase and is ignited. In the method, an air/fuel mixture is drawn by suction into the combustion chamber via a tank venting. Likewise, the invention relates to a control apparatus for an internal combustion engine, especially of a motor vehicle, as well as an internal combustion engine especially for a motor vehicle.

BACKGROUND OF THE INVENTION

A method of this kind, a control apparatus of this kind and an internal combustion engine of this kind are, for example, known in a so-called gasoline direct injection. There, the fuel is injected into the combustion chamber of the engine in a homogeneous operation during the induction phase and in a stratified operation during the compression phase. The homogeneous operation is preferably provided for the full-load operation of the engine; whereas, the stratified operation is suitable for the idle operation and part-load operation. For example, for a direct-injecting internal combustion engine of this kind, a switchover takes place between the above-mentioned operating modes in dependence upon the requested torque.

In homogeneous operation, an air/fuel mixture can be supplied to the combustion chamber via a tank-venting system. The fuel mass, which is injected directly into the combustion chamber during the induction phase, is homogeneously swirled until the ignition. For this reason, a homogeneous mixture develops in the combustion chamber. The lambda of the air/fuel mixture in the combustion chamber can be controlled (open loop and/or closed loop) via a lambda control to lambda=1.

In this way, an active charcoal filter, which is loaded with fuel, can again be discharged via a tank venting of this kind during homogeneous operation. The fuel, which vaporizes in a fuel tank, can thus be utilized via the tank venting.

In stratified operation, the problem is present that the air/fuel mixture, which is inducted via the tank venting, is too lean because of its low fuel component and therefore cannot be ignited so that uncombusted fuel is outputted to the ambient.

SUMMARY OF THE INVENTION

It is an object of the invention to provide a method for operating an internal combustion engine with which a fuel consumption of the least amount is achievable while simultaneously discharging the lowest possible vaporized fuel to the ambient.

This object is achieved in a method of the above-mentioned type in accordance with the invention in that, during a third operating mode, a lean air/fuel mixture is drawn by suction into the combustion chamber via the tank venting and, in addition, fuel is injected into the combustion chamber in the induction phase and in the compression phase. The task is correspondingly solved with a control apparatus and an internal combustion engine of the respective above-mentioned types.

The third operating mode defines a combination of the homogeneous operation and of the stratified operation. The air/fuel mixture, which is inducted via the tank venting and is too lean, is made richer and therefore can be ignited especially because of the injection of fuel during the induction phase. The total air/fuel mixture, which is disposed in the combustion chamber of the engine, can be ignited by the spark plug and combusted.

In this way, the fuel, which vaporizes from the tank, on the one hand, is supplied via tank venting again to the combustion chamber and is there used. On the other hand, it is ensured that even for a lean air/fuel mixture, which is supplied via the tank venting, a combustion takes place in the combustion chamber and therefore no uncombusted fuel is outputted to the ambient.

In an advantageous further embodiment of the invention, the lambda of the air/fuel mixture, which is inducted via the tank venting, is determined. Here, it is advantageous when the lambda is determined in dependence upon the concentration of the air/fuel mixture and/or in dependence upon the inducted air mass.

In a further advantageous embodiment of the invention, the third operating mode is only carried out when the lambda is greater than a pregiven value. With the aid of the pregiven value, it can be distinguished whether the air/fuel mixture, which is inducted via the tank venting, is sufficiently rich and therefore capable of ignition or is too lean and therefore not capable of ignition. In the last case, the third operating mode can then be executed whereas this would otherwise not perforce be required.

In a further advantageous embodiment of the invention, the distribution of the additional fuel to the compression phase and to the induction phase is determined in dependence upon the fuel supplied via the tank venting. In this way, it is possible to adapt the total fuel mass, which is supplied to the combustion chamber, to the torque to be generated by the engine.

Of special significance is the realization of the method of the invention in the form of a control element which is provided for a control apparatus of an engine, especially of a motor vehicle. A program is stored on the control element which is capable of being run on a computer, especially on a microprocessor, and is suitable for executing the method according to the invention. In this case, the invention is realized by a program stored on the control element so that this control element, which is provided with the program, defines the invention in the same way as the method which the program can carry out. Especially an electric storage medium can be used as a control element, for example, a read-only-memory or a flash memory.

Further features, application possibilities and advantages of the invention will become apparent from the following description of embodiments of the invention which are illustrated in the drawing. All described or illustrated features define the subject matter of the invention by themselves or in any desired combination independently of their summary in the patent claims or their dependency as well as independently of their formulation or presentation in the description and/or in the drawing.

BRIEF DESCRIPTION OF THE DRAWING

The single FIGURE of the drawing shows a schematic block circuit diagram of an embodiment of an internal combustion engine according to the invention.

DESCRIPTION OF THE PREFERRED EMBODIMENTS OF THE INVENTION

In the FIGURE, an internal combustion engine 1 of a motor vehicle is shown wherein a piston 2 is movable back and forth in a cylinder 3. The cylinder 3 is provided with a combustion chamber 4 which is, inter alia, delimited by the piston 2, an inlet valve 5 and an outlet valve 6. An intake manifold 7 is coupled to the inlet valve 5 and an exhaust-gas pipe 8 is coupled to the outlet valve 6.

An injection valve 9 and a spark plug 10 project into the combustion chamber 4 in the region of the inlet valve 5 and of the outlet valve 6. Fuel can be injected into the combustion chamber 4 via the injection valve 9. The fuel in the combustion chamber 4 can be ignited with the spark plug 10.

A rotatable throttle flap 11 is mounted in the intake manifold 7 and air can be supplied via the throttle flap to the intake manifold 7. The quantity of the supplied air is dependent upon the angular position of the throttle flap 11. A catalytic converter 12 is accommodated in the exhaust-gas pipe 8 and this catalytic converter serves to purify the exhaust gases arising because of the combustion of the fuel.

The piston 2 is displaced by the combustion of the fuel in the combustion chamber 4 into a back and forth movement which is transmitted to a crankshaft (not shown) and applies a torque thereto.

An exhaust-gas recirculation pipe 13 connects the exhaust-gas pipe 8 and the intake manifold 7. An exhaust-gas recirculation valve 14 is accommodated in the exhaust-gas recirculation pipe 13. In total, an exhaust-gas recirculation is realized in this manner. The exhaust-gas recirculation can but need not be perforce provided.

An active charcoal filter 15 is connected via a tank-venting pipe 16 to the intake manifold 7. A tank-venting valve 17 is mounted in the tank-venting pipe 16. The active charcoal filter 15 is assigned to a fuel tank. Fuel, which vaporizes from the fuel tank, is taken up by the active charcoal filter 15 and is intermediately stored. For an opened tank-venting valve 17, the intermediately stored fuel can be inducted via the tank-venting pipe 16 into the intake manifold 7. In total, a tank venting is realized in this way.

Input signals 19 are applied to a control apparatus 18 and these signals define measured operating variables of the engine 1. For example, the control apparatus 18 is connected to an air-mass sensor, a lambda sensor, an rpm sensor and the like. Furthermore, the control apparatus 18 is connected to an accelerator pedal sensor which generates a signal which indicates the position of an accelerator pedal, which can be actuated by the driver, and therefore indicates the requested torque. The control apparatus 18 generates output signals 20 with which the performance of the engine 1 can be influenced via actuators or positioning devices. For example, the control apparatus 18 is connected to the injection valve 9, the spark plug 10, the throttle flap 11 and the tank-venting valve 17 and the like and generates the signals required to drive the same.

The control apparatus 18 is, inter alia, provided to control (open loop and/or closed loop) the operating variables of the engine 1. For example, the fuel mass, which is injected by the injection valve 9 into the combustion chamber 4, is controlled (open loop and/or closed loop) by the control apparatus 18 especially with respect to a low fuel consumption and/or a low development of toxic substances. For this purpose, the control apparatus 18 is provided with a microprocessor on which a program is stored in a memory medium, especially in a flash memory, and this program is suited to execute the above-mentioned control (open loop and/or closed loop).

In a first mode of operation, a so-called homogeneous operation of the internal combustion engine 1, the throttle flap 11 is partially opened or closed in dependence upon the desired torque. The fuel is injected by the injection valve 9 into the combustion chamber 4 during an induction phase caused by the piston 2. The injected fuel is swirled by the air inducted simultaneously via the throttle flap 11 and is essentially uniformly distributed in the combustion chamber 4. Thereafter, the air/fuel mixture is compressed during the compression phase in order to be then ignited by the spark plug 10. The piston 2 is driven by the expansion of the ignited fuel. In homogeneous operation, the arising torque is dependent, inter alia, upon the position of the throttle flap 11. The air/fuel mixture is adjusted as close to lambda=1 as possible with respect to a low development of toxic substances.

In this first operating mode, it is possible to open the tank-venting valve 17 and therefore, in addition to the directly injected fuel mass, an air/fuel mixture can be inducted into the combustion chamber 4 from the active charcoal filter 15. The fuel mass, which is contained in the inducted air/fuel mixture can be determined by the control apparatus 18 from changes of lambda which are detected via the lambda sensor and thereby can be considered in the determination of the directly injected fuel mass.

In a second operating mode, a so-called stratified operation of the internal combustion engine 1, the throttle flap 11 is opened wide. The fuel is injected into the combustion chamber 4 by the injection valve 9 during a compression phase caused by the piston 2 and is so injected locally in the immediate vicinity of the spark plug 10 as well as at a suitable time interval ahead of the ignition time point. The fuel is then ignited with the aid of the spark plug 10 so that the piston 2 is driven in the following work phase by the expansion of the ignited fuel. In stratified operation, the developing torque is substantially dependent upon the injected fuel mass. Essentially, the stratified operation is provided for the idle operation and for the part-load operation of the engine 1.

The lambda of the air/fuel mixture, which is inducted via the tank venting, is determined in the second operating mode when the tank-venting valve 17 is opened and the tank venting is activated. For this purpose, the concentration of the fuel in the air/fuel mixture is applied. This concentration as such can be computed and is made available by the control apparatus 18. Likewise, the determination of lambda in dependence upon the air mass, which is supplied to the combustion chamber 4 via the throttle flap 11, is carried out and this air mass can, for example, be detected by means of an air-mass sensor.

If the determined lambda is less than a pregiven value, then this means that sufficient fuel is present and therefore the air/fuel mixture, which is present in the combustion chamber 4, is sufficiently rich in order to be ignited by the spark plug 10. In this case, an additional injection of fuel via the injection valve 9 takes place as required in the compression phase, that is, in stratified operation in order to generate the torque to be outputted by the engine 1.

If, however, the determined lambda is greater than the pregiven value, then this means that insufficient fuel is present and therefore the air/fuel mixture, which is present in the combustion chamber 4, is too lean in order to be ignited by the spark plug 10. In this case, the engine 1 is operated in correspondence to a third operating mode.

In this third operating mode, additional fuel is injected into the combustion chamber 4 via the injection valve 9 and, on the one hand, during the induction phase and, on the other hand, during the compression phase. This is therefore a double injection which takes place in correspondence to a combination of the homogeneous operation and of the stratified operation.

The air/fuel mixture in the combustion chamber 4 becomes richer and therefore more capable of ignition especially because of the injection of fuel during the induction phase. It is thereby possible to ignite the air/fuel mixture, located in the combustion chamber 4, by means of the spark plug 10.

The distribution of the additionally injected fuel to the induction phase and the compression phase is determined by the control apparatus 18 in dependence upon the air/fuel mixture supplied via the tank venting to the combustion chamber 4. The total additional injected fuel is dependent upon the torque to be generated by the engine.

The torque, which is generated by the engine 1, is comprised of that torque which results from the lean air/fuel mixture which is inducted from the active charcoal filter 15 via the tank venting as well as that torque which results from the fuel mass which is injected additionally directly into the combustion chamber 4.

In the event that a larger torque should arise than requested in the case of the described operation of the engine 1, then a corresponding throttling of the tank-venting valve 17 and/or the throttle flap 11 can reduce the generated torque to the wanted value. Likewise, it is possible to reduce the generated torque by retarding the ignition.

When the pregiven value of lambda is exceeded, the described third operating mode and therefore the double injection is carried out and the pregiven value can be applied in dependence upon operating variables of the engine 1.

What is claimed is:

1. A method for operating an internal combustion engine including an engine of a motor vehicle, the method comprising the steps of:

injecting fuel directly into a combustion chamber by an injection valve in a first operating mode during an induction phase or in a second operating mode during a compression phase and igniting the fuel with a spark plug;

inducting a lean air/fuel mixture into the combustion chamber via the tank venting in a third operating mode; and, injecting additional fuel into the combustion chamber in the induction phase and in the compression phase.

2. The method of claim 1, comprising the further step of determining the lambda of the air/fuel mixture which is inducted via the tank venting.

3. The method of claim 2, wherein the lambda is determined in dependence upon the concentration of the air/fuel mixture.

4. The method of claim 2, wherein the lambda is determined in dependence upon the inducted air mass.

5. The method of claim 2, wherein the third operating mode is carried out only when the lambda is greater than a pregiven value.

6. The method of claim 1, comprising the further step of determining the distribution of the additional fuel to the compression phase and the induction phase in dependence upon the fuel supplied via the tank venting.

7. A control element including a flash memory for a control apparatus of an internal combustion engine, including an engine of a motor vehicle, the control element comprising a program stored thereon which can be run on a computing apparatus including a microprocessor, and said program being configured to carry out the method steps of:

injecting fuel directly into a combustion chamber by an injection valve in a first operating mode during an induction phase or in a second operating mode during a compression phase and igniting the fuel with a spark plug;

inducting a lean air/fuel mixture into the combustion chamber via the tank venting in a third operating mode; and, injecting additional fuel into the combustion chamber in the induction phase and in the compression phase.

8. A control apparatus for an internal combustion engine including an engine of a motor vehicle, the engine having a combustion chamber into which fuel can be injected directly by an injection valve in a first operating mode during an induction phase or in a second operating mode during a compression phase and the fuel can be ignited by a spark plug; the control apparatus comprising means for controlling a lean air/fuel mixture to be drawn into the combustion chamber in a third operating mode via the tank venting; and, means for controlling the injection of additional fuel into the combustion chamber in the induction phase and in the compression phase.

9. An internal combustion engine including an internal combustion engine for a motor vehicle, the engine comprising:

a combustion chamber;

an injection valve for injecting fuel directly into said combustion chamber and a spark plug for igniting the injected fuel in a first operating mode during an induction phase or in a second operating mode during a compression phase; and, a control apparatus for controlling drawing a lean air/fuel mixture into the combustion chamber in a third operating mode via a tank venting and controlling the injection of additional fuel into the combustion chamber in the induction phase and in the compression phase.

* * * * *